United States Patent [19]

Morel

[11] 4,265,651
[45] May 5, 1981

[54] ROTARY FIRE-FINISHING MACHINE FOR GLASS ARTICLES

[75] Inventor: Jean Morel, Reims, France

[73] Assignee: Verreries Mecaniques Champenoises, Reims, France

[21] Appl. No.: 87,808

[22] Filed: Oct. 24, 1979

Related U.S. Application Data

[63] Continuation-in-part of Ser. No. 936,196, Aug. 24, 1978, abandoned.

[30] Foreign Application Priority Data

Aug. 26, 1977 [FR] France .............................. 77 26063

[51] Int. Cl.³ .............................................. C03B 29/04
[52] U.S. Cl. ...................................... 65/252; 65/104; 65/120; 65/284
[58] Field of Search .................. 65/104, 120, 252, 284

[56] References Cited

U.S. PATENT DOCUMENTS

| 780,864 | 1/1905 | Coleman, Jr. | 65/284 |
| 810,461 | 1/1906 | Blackburn | 65/284 X |
| 1,594,557 | 8/1926 | Proeger | 65/252 |
| 2,001,460 | 5/1935 | Haub | 65/252 X |
| 2,209,252 | 7/1940 | Stewart et al. | 65/252 |
| 2,248,430 | 7/1941 | Knight | 65/284 X |
| 2,338,841 | 1/1944 | Fedurlaak et al. | 65/252 |
| 2,883,797 | 4/1959 | Eldred | 65/284 X |

Primary Examiner—Arthur D. Kellogg
Attorney, Agent, or Firm—Mason, Fenwick & Lawrence

[57] ABSTRACT

The invention relates to a fire-finishing machine for glass articles, of the type comprising a frame, a vertical rotary assembly mounted on the frame, drive means for ensuring the rotation of the vertical assembly which further comprises means for supporting article supporting cups intended to move over a circular path and burner holder means provided to follow the cups in their movement, wherein the supply of the burners is subjected to the action of adjustable means for opening and closing the flows of fuel so that the burners are adjusted once and for all in optimum manner and it is possible to vary the portion of path of the cups where fire-finishing takes place. The invention is more particularly applied to the manufacture of glass articles whose shape may or may not be of revolution.

12 Claims, 11 Drawing Figures

FIG_1

FIG_5

FIG_9

FIG_10

FIG_11

ROTARY FIRE-FINISHING MACHINE FOR GLASS ARTICLES

This application is a continuation-in-part of earlier application Ser. No. 936,196 filed on Aug. 24, 1978 now abandoned.

The present invention relates to machines of the type known as fire-finishing machines, which are intended for remelting the surface of glass articles with a view to eliminating certain imperfections, such as sharp edges or irregularities, resulting particularly from the moulding of said articles.

The moulding of the articles is conventionally followed by the fire-finishing operation, followed by a passage in an annealing furnace. The fire-finishing installation therefore requires, in addition to the actual fire-finishing machine, a supply station and an evacuation station for the articles. U.S. Pat. No. 2,883,797 in particular, to J. W. Eldred, discloses a fire-finishing machine comprising a rotating assembly causing article-receiving cups, rotating on themselves, to describe a circular path. Each cup is followed by an overhanging burner thus allowing a homogeneous fire-finishing of the lips of the articles of cylindrical symmetry. In addition, the use of support cups or flat plates presents the advantage of an easy supply and evacuation of the articles.

However, this type of fire-finishing machine presents numerous drawbacks. Thus, it is not possible to stop operation of the burners when there are no articles on the cups, i.e. on a path where no fire-finishing is needed. Furthermore, the rotation of the cups is effected at a speed determined by that of the rotary assembly, this preventing any modulation of the fire-finishing of the lips of the articles.

Furthermore, the articles which are not symmetrical in shape and which consequently possess eccentric zones which would require a precise fire-finishing, for example the handle of a beer mug, cannot be treated adequately.

Similarly, this type of conventional machine involves an irrational fire-finishing of shaped articles, for example butter dishes. Moreover, only the intensity of the flame may vary, which, when it is increased, causes an increase in the waste of calorific energy on the portion of path where no fire-finishing is needed.

It is an object of the present invention to remedy these drawbacks. The fire-finishing machine according to the invention, among other advantages, allows in fact an overall fire-finishing both of the lip and of the body of the article, as well as an optimum use of the calorific energy due to the combustion of the burners. In addition, a fire-finishing at fixed station is quite possible by the absence of rotation of the support cups.

To this end, the fire-finishing machine according to the invention is of the type comprising a frame, a vertical rotary assembly mounted on the frame, drive means for ensuring the rotation of the vertical assembly; said assembly comprises means for supporting rotary cups displaceable over a circular path, and burner supporting means provided to follow the cups in their movement.

According to one feature, the fire-finishing machine according to the invention is characterised in that the supply of the burners is subjected to the action of adjustable means for opening and closing the flows of fuel, so that the burners may be optimally adjusted once and for all, whereas, it is possible to vary the portion of path of the cups where fire-finishing takes place. Of course, a "pilot light" allows the burner to be lit through the opening means when each cup enters in the fire-finishing zone and receives an article.

According to another feature of the machine according to the invention, each support cup may be subjected to the action of at least one overhanging burner and at least one lateral burner, which are supplied with combustible gas and combustion supporter, in adjustable manner and separately, in order to fire-finish the lip and/or the body of the articles, respectively.

According to a preferred embodiment, said opening and closing means are constituted by fixed fingers which are adjustable in position on the path of flow opening and closure valves of the burners in order to control them if and when needed. More precisely, a first and a second ring supporting fingers are made, respectively cooperating with the flow valves of overhanging burners and of lateral burners.

According to a further feature, the cups, which are mounted to rotate on their support means, are subjected to adjustable and disconnectable drive means allowing a rotary fire-finishing at two velocity stages or non-rotary fire-finishing, according to the shape of the articles, each velocity stage being adjustable independently of each other.

According to another feature, one burner per cup is mounted to be radially adjustable with respect to the vertical assembly in order to allow a precise fire-finishing of a fixed point of the articles to be fire-finished or of the side surface of the articles. The supply and evacuation of the articles are advantageously ensured by means of revolving members located in adjustable manner on the circumference of the machine. It is thus possible to adjust, to a certain extent, the fire-finishing time depending on the user's wishes.

The invention will be more readily understood on reading the following description with reference to the accompanying drawings, in which.

Figure 1:
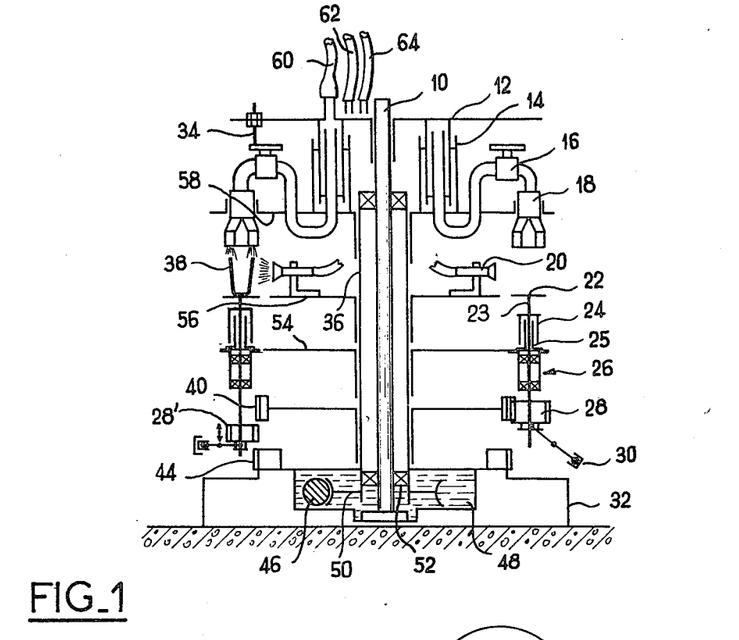
FIG. 1 shows a partial schematic view of a vertical axial section through the machine according to the invention.

In the embodiment shown in FIG. 1, the rotary assembly is constituted by a fixed shaft 10 resting on a frame 32 and by a central column 36 mounted to rotate, via rollers 52, about the shaft 10. The drive means intended to ensure the rotation of the column are advantageously effected by means of a drive wheel 50 meshing with a tangential endless screw 46 moved by a variable speed motor unit (not shown). The wheel 50 and the screw 46 bathe in the oil of a tight casing 48. The means fast with the column intended for supporting the support cups 22 are constituted by a support cup holder plate 54. The vertical shafts 23 of the support cups 22 are mounted to rotate in roller bearing cases 26 fixed to the lower part of the plate 54, so as to avoid a premature wear of the rollers by the heat and abrasion due to the crushed glass. Moreover, protective covers 24 efficiently protect the points of insertion 25 of the shafts 23 in the cases 26. It is very clearly seen that the rotation of the plate 54 fast with the column 36 takes the support cups in a circular path perpendicular to the plane of FIG. 1. To ensure rotation of the support cups on themselves, sliding pinions 28, 28' are mounted on the shafts 23. These pinions 28, 28' are actuated on their shaft 23 by means of a conventional system of the type with sliding gear and fixed cam 30. In high position, the "right-hand" pinion, referenced 28, meshes on a gear wheel 40 fast with the central column and rotating therewith. In this case, the support cup cannot rotate about its axle 23 since there is no relative movement between the wheel 40 and the pinion 28. On the contrary, if the "left-hand" pinion 28' is lowered, it meshes on the wheel 44. Either the wheel 44 is fixed to the frame 32, or it is rotated about its vertical axle via drive means (not shown in the Figure). In the first case, the rotary movement of the central column induces a relative movement of rotation between the pinion 28' and the wheel 44, and a rotation is then obtained of the support cup supporting the article 38 of which the speed of rotation on itself depends on the reduction ratios chosen on the gears. In the second case, the speed of rotation of the support cup is directly dependent on the variable speed of the wheel 44. It is therefore seen that it is possible to regulate the speed of rotation of the support cups on themselves due to the simple configuration of the machine according to the invention.

The lateral burners 20 which follow the support cups 22 in their circular path are supported by means of a lateral burner holder plate 56 fast with the column 36 with, however, the possibility of a vertical adjustement so as to be able to fire-finish the articles 38 precisely and correctly. The ring burners 18 located above the support cups 22 are fixed to a ring burner holder plate 58, likewise fast with the column 36 and also with possibility of vertical adjustment. The ring burners 18 are supplied by means of an inlet of combustion support ter/gas mixture 60 adjoining a fixed plate 12 fast with the shaft 10. The mixture is distributed to the ring burners 18 via a liquid seal 14 or conventional gasket. 16 denotes cocks for controlling the flow of supply of mixture to the ring burners. Fingers 34 are advantageously fixed to the plate 12, their role being to ensure the closure and opening of the cocks 16 when the latter pass vertically plumb with the fingers in the course of their circular path. A similar supply system, with tight chamber or liquid seal located in the central column, is used to ensure the supply of the lateral burners 20 via an inlet of gas 62 and an inlet of oxygen 64 or other supporter of combustion which alone are shown in FIG. 1. It is seen that, due to the fingers, it is quite possible to be master of the individual combustion of the lateral burners and of the ring burners so as to allow them to function only on the path where the support cups 22 support an article 38. For this, reference will be made to the left-hand part of FIG. 1.

Figure 2:
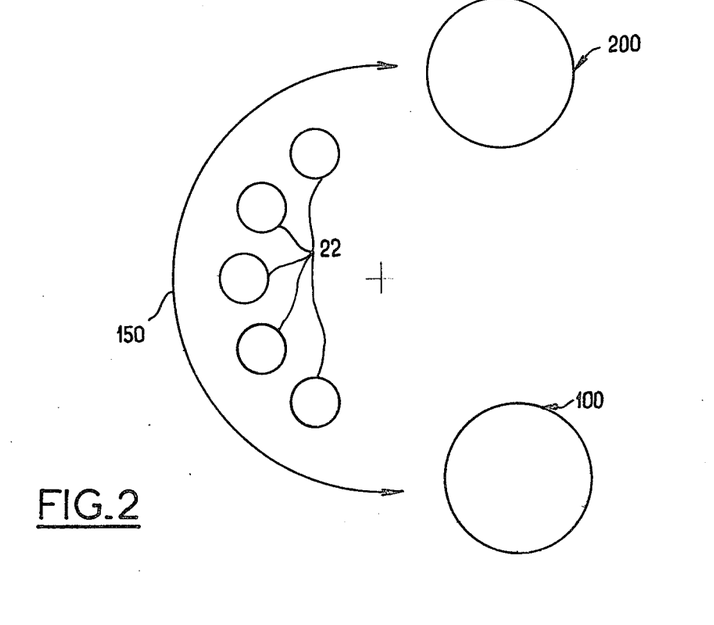
FIG. 2 shows a very schematic partial view from above, showing the respective positions of the supply and evacuation means with respect to the paths of the support cups in a machine according to the invention.

FIG. 2 shows, very schematic and partial, a possible arrangement of a supply turntable 100 and of an evacuation turntable 200. The arrow 150 indicates the zone of fire-finishing of the support cups 22. It is possible to adjust the position of the turntables 100 and 200 and it will be readily appreciated that the burners must function on the path indicated by the arrow 150. The arrangement of turntables 100 and 200 is of known type, for instance as described in published French Pat. No. 75 39 083 cited here as a reference.

Figure 3:
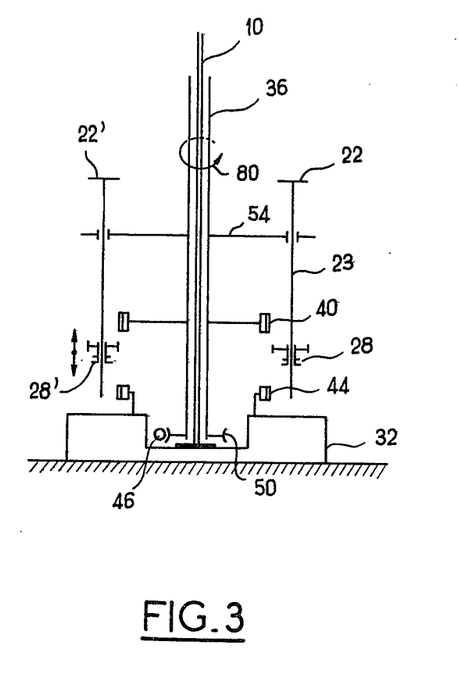
FIG. 3 shows a partial illustration of the kinematic chain of the machine according to the invention.

FIG. 3 shows a partial illustration of the kinematic chain of the machine according to the invention. It is seen that by positioning the "right-hand" sliding pinion 28 opposite the wheel 40, fast with the column 36, the "right-hand" support cup 22 is unable to rotate about its axle 23 in the course of the rotation indicated by arrow 80. On the other hand, by positioning the "left-hand" pinion 28' so that it meshes on the fixed wheel 44, it is clear that the support cup 22' will rotate on itself in the course of the circular path provoked by the rotation of the column 36 in the direction of arrow 80. As was stated when describing FIG. 1 hereinabove, an assembly comprising a possibility of rotation of the wheel 44 makes it possible to induce a rotation of the support cups 22' at a variable speed independent of the speed of rotation in the direction of arrow 80.

The embodiment described hereinabove appears complicated since it comprises as many fire-finishing assemblies as there are support cups. This may appear a drawback from the point of view of adjustment, but it must be known that the burner holder plates are rigid elements always rotating with the support cup holder plate 54 and consequently the burners remain constantly perfectly centered with respect to the support cups. The adjustment of the burner holder plates in height furthermore enables the vertical adjustment of all the burners to be perfected once only. As has been seen above, it suffices that the sliding pinion 28 meshes with the wheel 40 for the support cup not to rotate on itself. A particular point of the article, for example the handle of a mug, may then be fire-finished. For the support cup to rotate on itself, it suffices that the sliding pinion 28 meshes on the wheel 44. It is then possible to fire-finish the edge of the article with an overhanging or ring burner, or a lateral burner, or to have a general fire-finishing in the body of the article. In principle, with a ring burner, it would not be compulsory to rotate the article, but in practice, there can be no assurance that the intensity of the flame will be identical over the whole periphery of the burner, and it is therefore preferable to rotate the article to obtain a uniform fire-finishing. A fixed cam 30 makes it possible, according to its position, to initiate the beginning or end of rotation of the support cups on themselves in the course of a cycle. As the burners are put into action as desired by the positioning of the fingers, the choice of the mode of fire-finishing or the time of each fire-finishing is absolutely free.

In the case of loading at two points, as in the above cited arrangement, it suffices to have a double set of fingers (over different diameters), offset angularly by an angle equal to the spacing of the two loads.

The fire-finishing machine according to the invention therefore comprises, as has just been seen, a very simple mechanism which is therefore inexpensive to maintain:

in fact, the machine roughly amounts to a central rotating column supporting a plurality of plates, one of which supports support cups controlled by a sliding pinion meshing either on a fixed wheel or on a wheel fixed on the central column. This configuration makes it possible to eliminate a large number of the drawbacks of the fire-finishing machines of known type. In particular, it is possible to effect fire-finishing at fixed station by precisely checking the fire-finishing time which, moreover, is uniform. Furthermore, the waste of calorific energy is minimised whilst it is possible to fire-finish the lips of the articles of simple shape.

Reference will now be made to FIGS. 4 to 11 concerning an improved fire-finishing machine made according to the invention.

Figure 4:
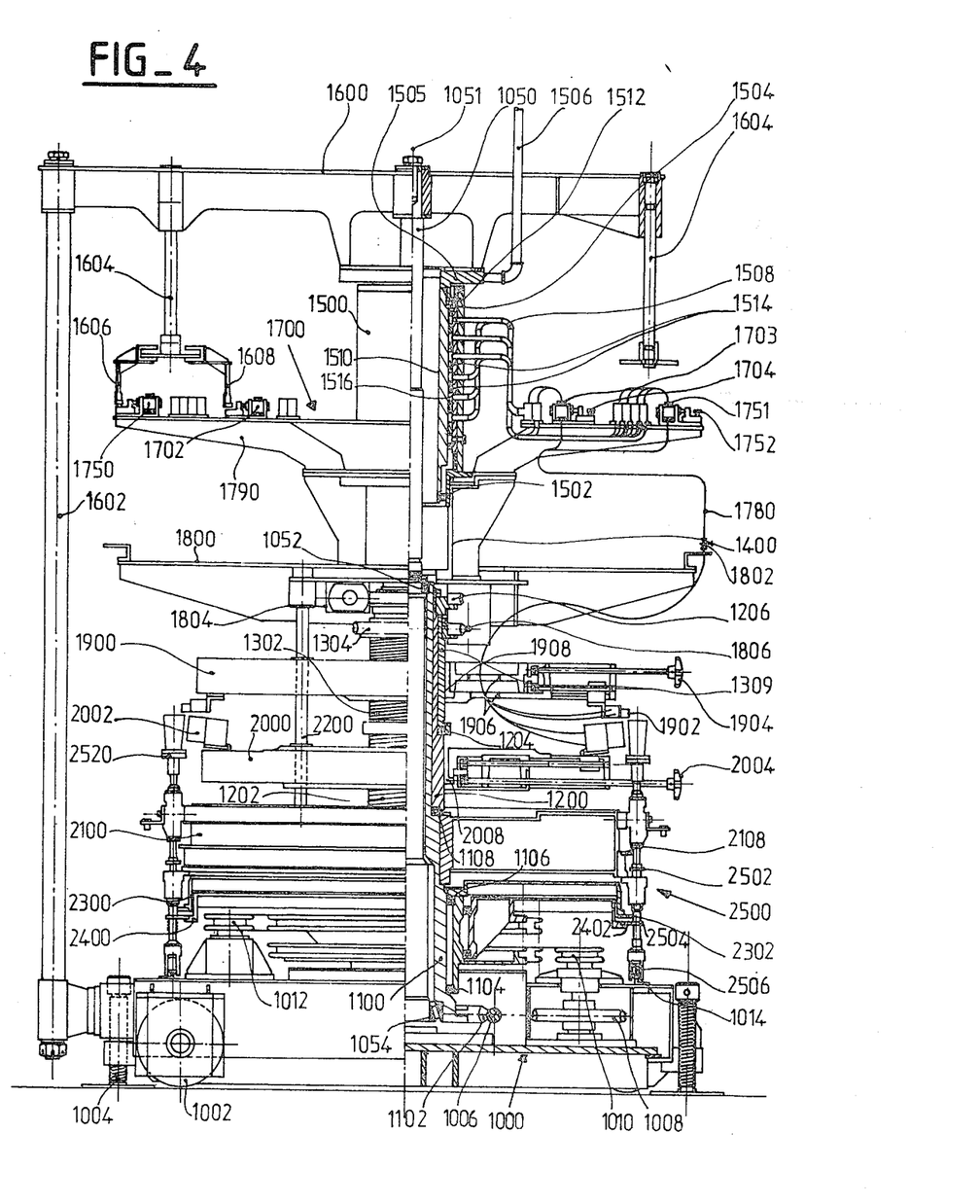
FIG. 4 shows a side elevation in partial half-section of an improved embodiment of a fire-finishing machine according to the invention to which the following Figures refer.

FIG. 4 clearly shows, in a general view, the relations between the different parts of the fire-finishing machine. More particularly, the left-hand half-view shows a side view of the elements disposed in the same vertical axial plane and which are cyclically repeated around the vertical axis of the fire-finishing machine. The right-hand half-view is a section similar to the left-hand half-view.

The fire-finishing machine essentially comprises a fixed frame 1000 provided with bearing wheels 1002 which allow the displacement in translation of the whole of the fire-finishing machine. Feet 1004 with threaded rods enable the machine to be fixedly positioned, the wheels then no longer being in contact with the ground. This frame presents in particular a fixed shaft 1050 of axle 1051 which serves as rotary support for the rotating parts of the fire-finishing machine. The latter essentially comprises, from top to bottom, a finger-holder plate 1600 which is fixed, a valve-holder supply plate 1700 which is mobile in rotation and on which abuts a fluid dispenser 1500 allowing the burners to be supplied. At the lower part of this valve-holder supply plate there is located a rotatable accessory-holder plate 1800, separated by a cross-piece 1400. A plate 1900 holding lip burners and a plate 2000 holding body burners are then found, rotating with the cup holder plate 2100 via drive guides 2200. Finally, a primary drive plate 2300 and a secondary drive plate 2400 make it possible to modulate the movement of the cups 2520 of the cup holder assemblies as desired, as will be seen hereinafter.

These different elements will now be described in greater detail in order to understand their interactions more readily. The central shaft 1050 comprises two upper and lower conical roller bearings 1052 and 1054 respectively, on which is mounted, concentric with respect to the shaft 1050, a drive sleeve 1100. The latter presents, in its lower part, a helically toothed ring 1102 which cooperates with an endless screw 1006 of the frame to drive the sleeve 1100 in rotation. The sleeve 1100 supports, on its outer periphery, two lower and upper roller bearings 1104 and 1106 respectively, on which the primary drive plate 2300 is rotatably mounted, on which the secondary drive plate 2400 is also rotatably mounted, in concentric manner, as will be seen from the detailed description of FIG. 9. The frame further presents a helically toothed ring 1008 moved by a motor with endless screw (not shown) fast with a primary pulley 1010 provided to drive the primary drive plate 2300 in rotation. Similarly (cf. the left-hand half-view), the frame is also provided with a secondary pulley 1012 provided to rotate the secondary plate 2400.

The cup-holder plate 2100 is fast with the sleeve 1100 and is consequently rotated by the endless screw 1006. A horizontal shoulder of the sleeve 1100 receives a horizontal roller bearing 1108 on which abuts a first concentric bearing sleeve 1200 which presents an outer male thread 1202. This thread 1202 cooperates with a female thread 2008 of the body burner holder plate 2000 and enables this plate to be adjusted in height by endless screw effect. To this end, the sleeve 1200 presents in its upper part a helical toothed ring 1206 rotated by an endless screw control 1804 of the accessory holder plate 1800. Like sleeve 1100, the sleeve 1200 presents a horizontal shoulder on its outer periphery on which is mounted a horizontal roller bearing 1204 provided to receive the lower part of a second bearing sleeve 1300 mounted concentrically around the sleeve 1200. As before, this sleeve comprises a male thread on its outer periphery 1302 adapted to cooperate with a female thread 1908 of the plate 1900 holding the lip burner, this enabling the height of this plate to be adjusted by relative rotation of the sleeve 1300 with respect to the plate 1900. To this end, the sleeve 1300 is fast with a helical toothed ring 1304 driven by the endless screw 1806 of a control fast with the plate 1800. It will therefore be noted that the sleeves 1100, 1200 and 1300 are capable of relative rotation with respect to one another but that, when the controls 1804 and 1806 are blocked, the sleeve 1100 rotates all the plates 1800, 1900, 2000 and 2100 made angularly fast by the drive guides 2200 which pass through the burner holder plates 1900 and 2000. The relative rotation of the sleeves 1200 and 1300 therefore enables the vertical position of the burner-holder plates to be modified by sliding the latter along the guide cross-piece 2200.

Figures 7, 8:
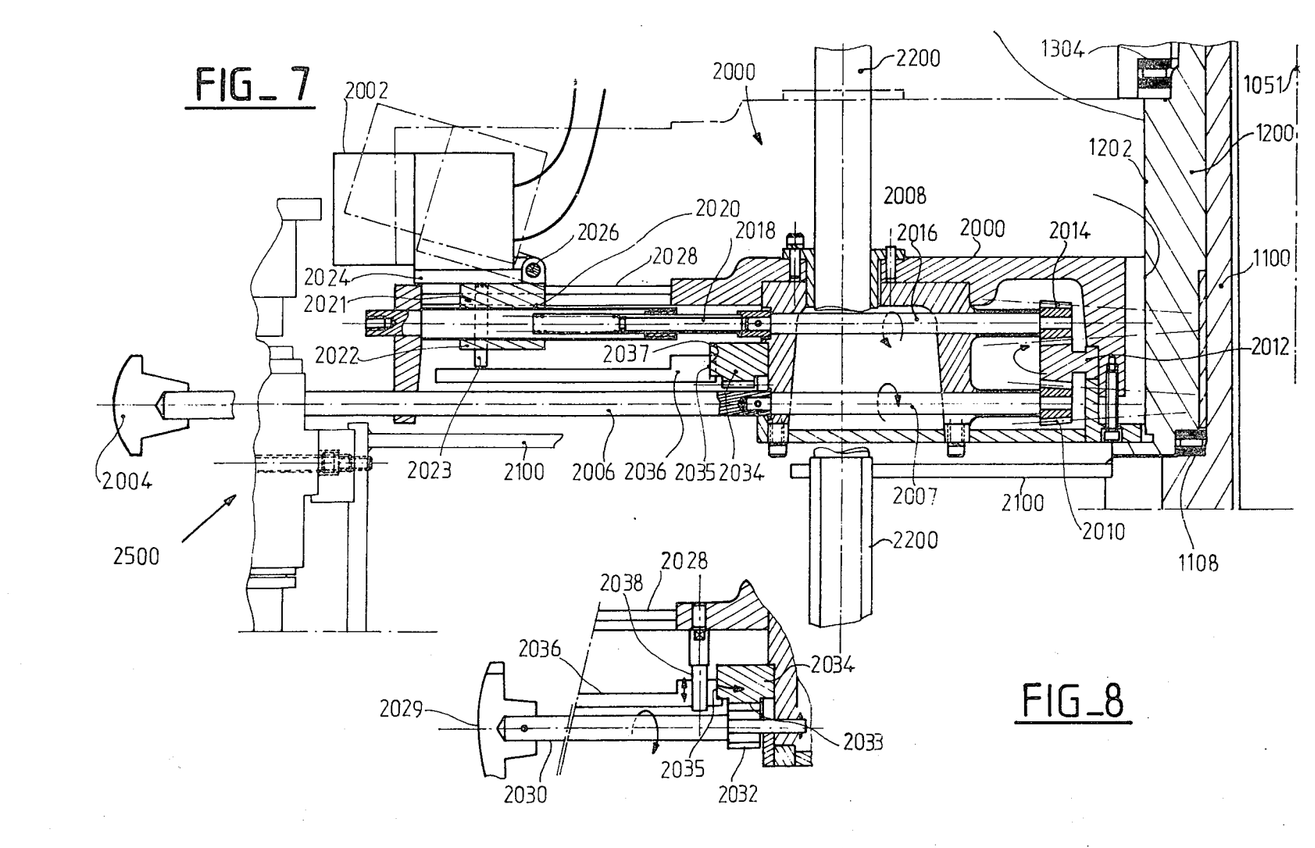
FIG. 7 shows, in partial section, the means for adjusting the article body burners in radial translation.
FIG. 8 shows a partial section of the means for adjusting the body burners in height.

Each plate 2000 comprises a plurality of body burners 2002 of which the position and direction are adjustable by means of a device 2004 with handle which will be explained when describing FIG. 7 and which has been shown superimposed on the right-hand half-section. Similarly, the plate 1900 comprises lip burners 1902 located vertically with respect to the burners 2002 and of which the position may, with respect to shaft 1050, be adjusted radially via a device 1904 with handle similar to that of the body burners and which is shown in FIGS. 7 and 8. In addition, the plate 1900 presents orifices 1906 allowing passage for the different pipes 1780 supplying the burners. The accessory holder plate 1800 has flow adjustment valves or block valves 1802 enabling the supply of the burners to be optimalized. It will be understood that this supply comprises two combustible (gas) intake conduits and two combustion supporter (oxygen) intake conduits for supplying burners 1902 and 2002 respectively. The valve-holder supply plate 1700 essentially comprises a first inner row of pairs of valves 1702, 1703, controlled by rollers 1704 and a second outer row of pairs of valves 1750, 1751, controlled by rollers 1752. The first row controls the supply of the body burners and the second outer row controls the supply of the drinking edge burners.

These valves are supplied via the rotary distributor 1500 which comprises a stator and a rotor. The stator is essentially composed of a fixed annular supply plate 1505 which receives the fluid (combustible and supporter of combustion) intake conduits 1506. Said plate is fast with a supply sleeve 1510 in which are conducted the fluids from conduits 1506 in manner not shown. The rotor essentially comprises, in a plurality of fast pieces, an outer cylindrical distribution sleeve 1512 from which leave a plurality of distribution conduits 1508 for supplying oxygen and combustible gases separately to the different rows of valves. This sleeve is provided on its inner wall with O-rings 1514 which define therebetween annular collector chambers 1516. Two roller bearings 1502 and 1504 allow the rotation of the rotor with respect to the stator. The fluid (combustible or supporter of combustion) conducted through a conduit 1506 is conveyed in the sleeve 1510 up to a chamber 1516 at which the mobile conduits 1508 are supplied.

The finger-holder plate 1600 is fast with the frame by at least one support column 1602 and presents, regularly distributed angularly, fixed shafts 1604 supporting a ring on which are positioned fingers 1606 and 1608 which act respectively on the rollers 1704 and 1752 in order to open and close the pairs of valves which supply each couple of body burner and of lip burner.

Finally, reference will be made to the cup holder assemblies 2500 which essentially present an upper pinion 2502 adapted to cooperate with a toothed ring 2108 of the plate 2100 and a lower pinion 2504 adapted to cooperate either with the toothed ring 2302 or with the toothed ring 2402 of the plates 2300 and 2400 according to the position in height of the cam paths 1014 of the frame which act on a roller 2506 of the cup assembly. The functioning of this device is explained hereinafter with reference to FIG. 10.

It will be understood that the plates 1700, 1800, 1900, 2000 and 2100 constitute a rotary assembly fast with the sleeve 1100 and which is driven in rotation by the endless screw 1006 acting on the helical toothed ring 1102. The relative rotation of the sleeves 1200 and 1300 from the controls 1804 and 1806 simply allows the positioning in height of the burner holder plates 1900 and 2000 which follow in the same vertical plane each cup holder assembly 2500 carried by the plate 2100. When the upper pinion 2502 meshes the toothed ring 2108, the cup 2520 is immobilised in rotation. Furthermore, when the pinion 2504 meshes either the toothed ring 2302 or the ring 2402, the cup has a speed of rotation on itself determined by the pulleys 1010 and 1012 which drive the plates 2300 and 2400. Each burner holder plate advantageously comprises a handle-adjustment 1904 and 2004 corresponding to each couple of burners and which makes it possible to adjust, radially and in inclination, each body burner with respect to the central fixed shaft of the fire-finishing machine and radially, each lip burner.

Figure 5:
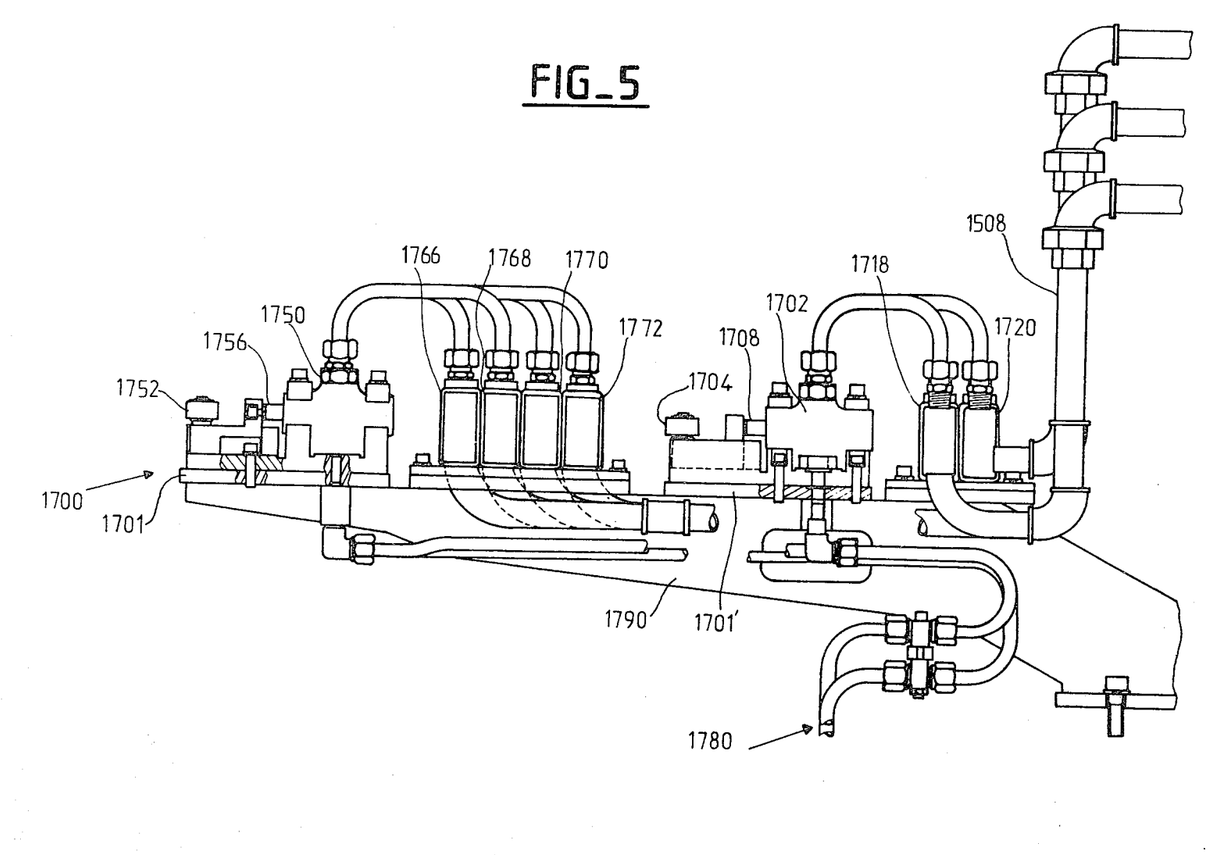
FIG. 5 shows a partial half-elevation of the supply means of FIG. 4.
Figure 6:
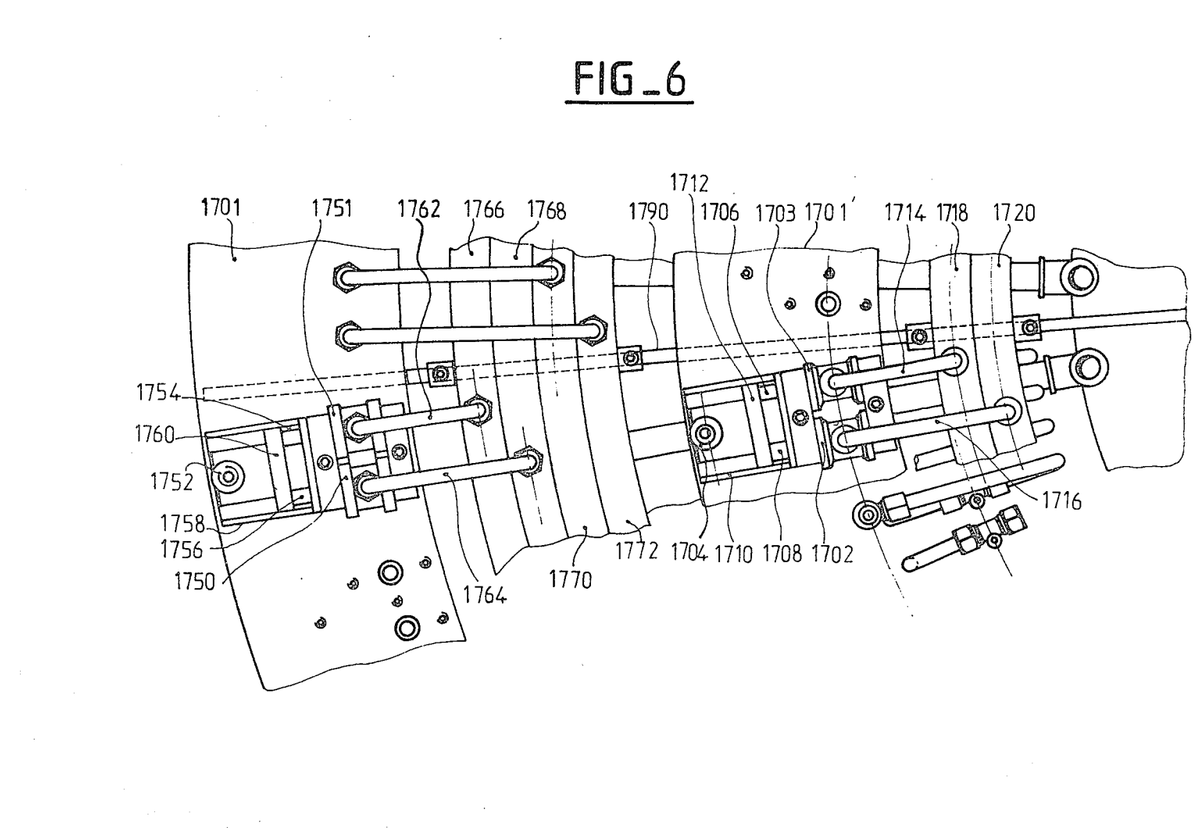
FIG. 6 shows a plan view corresponding to FIG. 5.

Reference will now be made to FIGS. 5 and 6 which relate more particularly to the plate supplying the fire-finishing machine. The plate 1700 is essentially constituted by brackets 1790 which support two concentric annular plates 1701 and 1701'. On the latter, a first row of pairs of slide valves 1750, 1751 and a second row of pairs of slide valves 1702, 1703 are regularly distributed. Each pair of valves supplies a burner with supporter of combustion and with combustible gas. The pairs of valves are respectively controlled by rollers 1752, 1704 which are mounted in a guide 1758 and 1710 in order to drive a slide 1760, 1712 which acts on the control shafts 1754, 1756 and 1706, 1708 of each valve. The latter are supplied via toric manifolds of rectangular section which are themselves supplied via pipes 1508. More precisely, the manifold 1766 supplies combustible gas to valve 1751 via the conduit 1762 whilst the manifold 1768 supplies the valve 1750 via the conduit 1764 which, itself, conveys a combustion supporter. Similarly, the manifolds 1770 and 1772 respectively supply gas and a combustion supporter to a pair of valves of the outer row which has not been shown and which, coupled with the pair 1750, 1751, supplies the same lip burner for reasons of fluid flow. Similarly, the gas manifold 1718 supplies the valve 1703 via the conduit 1714 and the oxygen manifold 1720 supplies the valve 1702 via the conduit 1716. Conduits 1780 will then supply the burners from the lower part of the valves, through the plates 1701, 1701'.

FIGS. 7 and 8 show the devices for adjusting the position of the body burners. These devices are adjacent to each burner-cup assembly and have only been shown in the case of body burners. However, similar radial adjustment devices exist for lip burners and may be seen in FIG. 4.

FIG. 7 shows a partial section of the device for radially adjusting a body burner. The corresponding cup assembly 2500 is recognized, superimposed in the left-hand part of the Figure. In the same way, the guide crosspiece 2200 fast with the plate 2100 is visible. In the right-hand part of the Figure is to be noted the sleeve 1200 as well as the roller bearings 1108 and 1204; the sleeve 1200 may rotate with respect to the sleeve 1100 via the roller bearing 1108. The threaded part 1202 cooperates with its female homologue 2008, this allowing a vertical adjustment of all the plate 2000. The roller bearing 1204 serves as support for the sleeve 1300 (not shown). The handle 2004 is fast with a first control rod 2006 which drives a shaft 2007 the end of which is provided with a first bevel gear 2010 which meshes on a double toothed ring 2012 of axle 1051 and mounted to rotate on the plate 2000. The upper face of this toothed ring meshes with a second bevel gear 2014 fast with a countershaft 2016 which actuates a fluted rod 2018 driving a threaded rod 2020. The body burner 2002 is mounted on a carriage 2022 sliding on a guide 2028 and urged by the thread of the rod 2020 which cooperates with that of the bore 2021. In addition, the burner is mounted on a support plate 2024 mounted to rotate on the shaft 2026 of the carriage, this allowing its tipping under the effect of a pin 2023 passing through the carriage and the lower part of which is urged by an annular plate 2036 of which the central bore 2037 cooperates with the thread 2035 of a toothed ring 2034. When the handle 2004 is rotated by an operator, the shaft 2007 induces, via the ring 2012, urged by the pinion 2010, the rotation of all the pinions 2014 of each body burner, this allowing the simultaneous adjustment of all the burners distributed over the periphery of the plate 2000. The rotation of each shaft 2016 provokes that of the threaded rods 2020 and consequently the displacement, by endless screw effect, of the carriages 2022, this simultaneously allowing the radial adjustment with respect to the axle 1051 of all the body burners.

The detail of FIG. 8 makes it possible readily to understand, in cooperation with FIG. 7, how the inclination of the body burner (cf. dotted line) may be effected. A handle 2029 (not shown in FIG. 4), and offset angularly with respect to the handle 2004, drives a control shaft 2030 the end of which comprises a bevel pinion 2032 meshing on the lower toothed part 2033 of the ring 2034 which, like ring 2012, has an axle 1051 and is mounted to rotate on the plate 2000. Moreover, it presents a lateral helical thread 2035 which cooperates with a corresponding thread 2037 of the annular plate 2036 the rotation of which about the axle 1051 is prevented by the pin 2038 fixed with respect to the guide 2028. Consequently, the rotation of the ring 2034 provokes the vertical movement of the plate 2036 which, via the pin 2023 provokes the tipping of the plate 2024 with respect to the axle 2026 and consequently of the burner 2002.

It will be noted that the adjusting devices according to FIGS. 7 and 8 are disposed circumferentially at the level of each cup assembly 2500 concerning the body burners whilst only one similar radial adjustment device, controlled by a handle 1904, is disposed at the level of each lip burner 1902.

Figure 9:
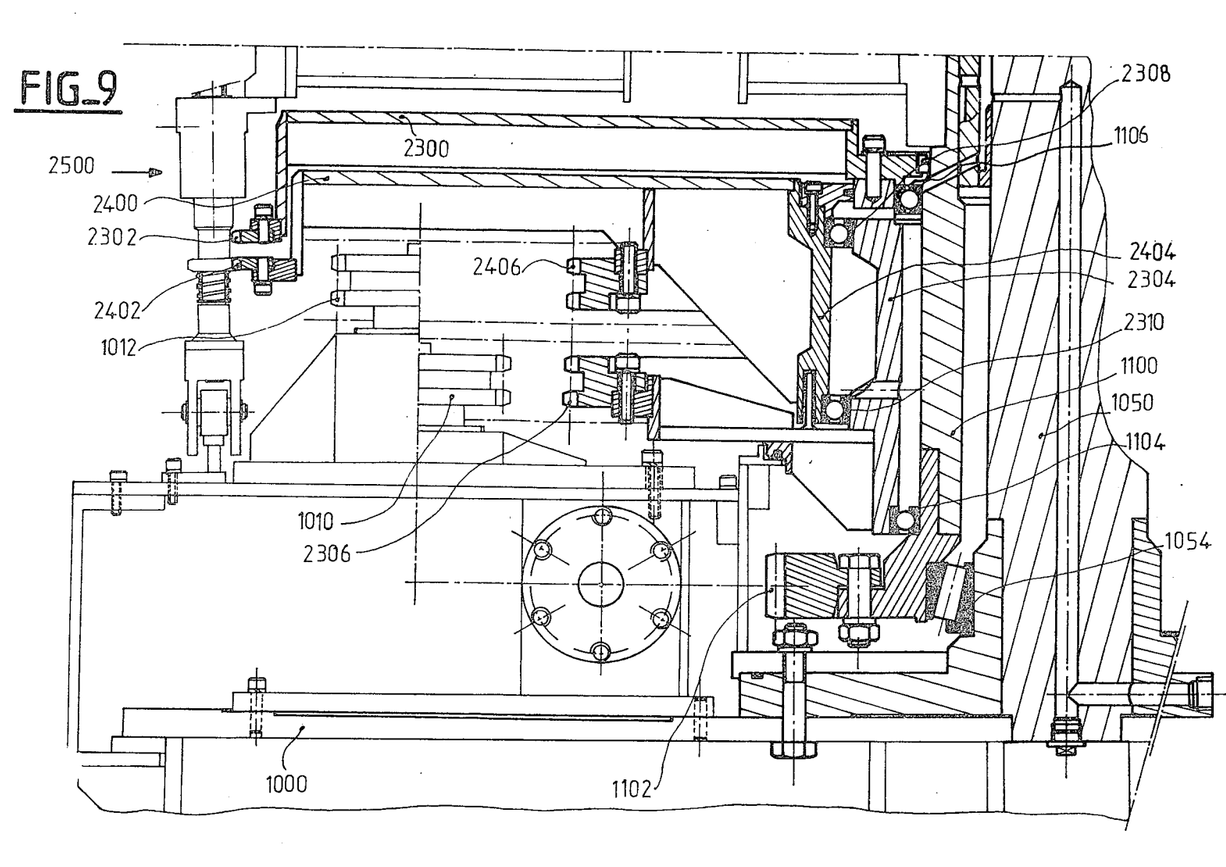
FIG. 9 shows a partial half-section of the lower left-hand part of the fire finishing device of FIG. 4.

FIG. 9 clearly shows the detail of the lower part of the frame in a half-section of the left-hand part of FIG. 4. On the left-hand part is noted a cup holder assembly 2500 whilst the primary drive pulley 1010 has been shown superimposed and in half-section at the level of the secondary drive pulley 1012. Around the shaft 1050 is recognized the conical roller bearing 1054 on which is mounted the drive sleeve 1100 which presents, in its lower part, a helically toothed ring 1102 which enables the rotating parts of the fire-finishing machine to be driven.

The roller bearings 1104 and 1106 make it possible to receive a primary sleeve 2304 fast with the primary plate 2300, which assembly therefore authorises a relative rotation of the primary drive plate 2300 with respect to the drive sleeve 1100. This drive is effected via a chain (not shown) which connects the pulley 1010 to the drive ring 2306 fast with the sleeve 2304.

Said latter also bears two upper and lower roller bearings 2308 and 2310 respectively, on which is rotatably mounted a secondary sleeve 2404 concentric with respect to the primary sleeve 2304, this allowing a relative rotation of this sleeve with respect to the sleeve 2304 and the drive sleeve 1100. Of course, said sleeve 2404 is fast with the secondary plate 2400 and allows its drive in rotation via a drive ring 2406 driven by the pulley 1012 by means of a chain (not shown). It will be noted that the plates 2300 and 2400 are respectively provided at their periphery with toothed rings 2302 and 2402 of which the role will be explained hereinafter.

Figure 10:
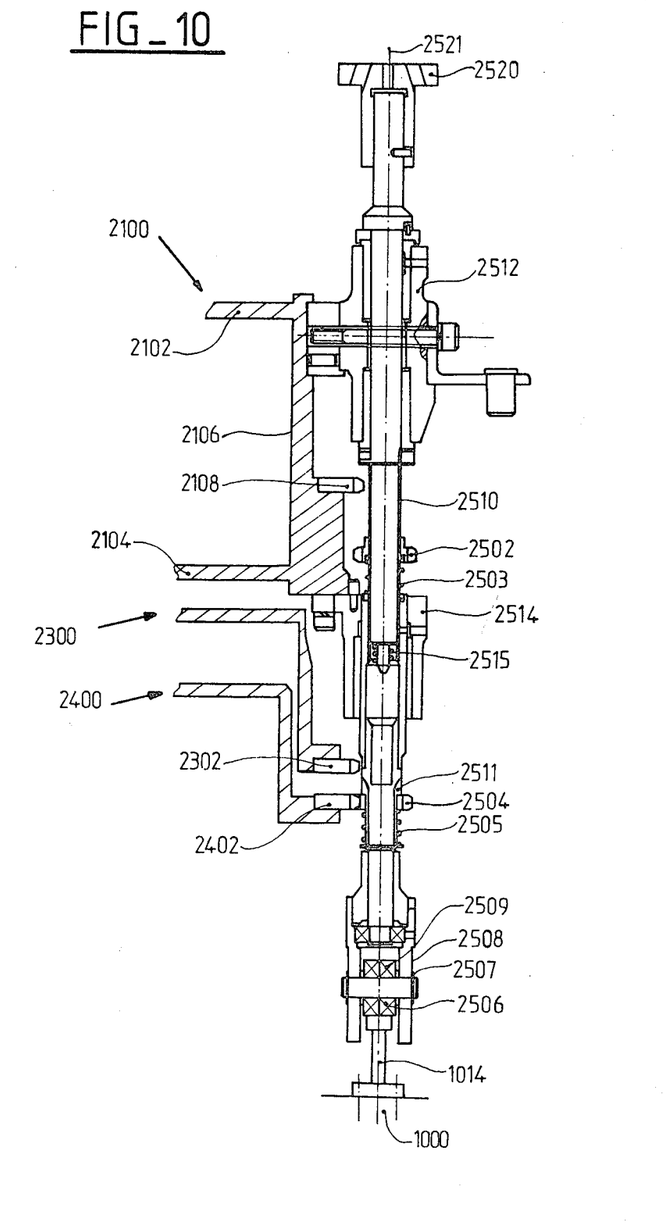
FIG. 10 shows, in partial section, a cup support assembly.

FIG. 10 shows the detail of a cup holder assembly 2500. This assembly 2500 is fixed to the cup holder plate 2100 via an upper bearing block 2512 and a lower bearing block 2514 which are respectively fixed to the vertical belt 2106 which supports the upper plate 2102 and the lower plate 2104 constituting the plate 2100. The cup 2520 is capable of rotation about its axle 2521 via two splined shafts 2510 and 2511 which rotate with each other. The shaft 2510 bears on its splines the upper toothed pinion 2502 which is elastically mounted by means of a spring 2503 and which presents ribs corresponding to the splines of the shaft 2510 and therefore rotates therewith. The lower toothed pinion 2504 is mounted similarly by the spring 2505 on the splined shaft 2511. The lower part of the shaft 2511 presents a stirrup member 2508 mounted to rotate by a bearing 2509 about the shaft 2511. This stirrup member presents a shaft 2507 provided with a roller 2506 which is urged into rolling abutment via a spring 2515 against a cam path 1014 of height adjustable with respect to the frame 1000. The primary and secondary drive plates 2300 and 2400 as well as their toothed ring 2302 and 2402 are found. Furthermore, the belt 2106 likewise bears a locking toothed ring 2108.

The device for rotating the cup 2520 enables the movement of said cup to be modulated in 5 different positions of the height of the adjustable cam path 1014. As shown in FIG. 10 and FIG. 4, the assemblies 2500 are in the first position where the pinion 2504 meshes with the toothed ring 2402 of the primary drive plate 2400. In this case, the cup 2520 is driven at a secondary speed of rotation which depends on the reductions existing between the pulley 1012 and the ring 2406. In the second position, the pinion 2504 comes into position between the rings 2302 and 2404 and consequently the cup 2520 does not rotate on itself. In the third position, the pinion 2504 meshes on the ring 2302 and the cup has a primary speed of rotation depending on the reduction existing between the pulley 1010 and the ring 2306. In the fourth position, the pinion 2504 is located above the ring 2302 whilst the pinion 2502 does not yet mesh the ring 2108. This position is equivalent to the second position and the cup does not rotate on itself. Finally, in the fifth position, the upper pinion 2502 meshes on the ring 2108 and the cup is blocked and unable to rotate on itself. Each of these positions corresponds by construction to a cam path raised by a distance corresponding to the common thickness of the pinions 2504 and 2502 as well as the toothed rings 2402, 2302 and 2108. As is seen, the relative speed of rotation of the cups and consequently that of the articles that they support may be modulated as desired by means of these two connectable pinions. It will be noted that, with respect to the previously described embodiment, a plate has been added, this enabling the speeds to be advantageously modulated.

The circumferential distribution of the assemblies 2500 around the vertical rotary assembly holding the cups 2520 is preferably made so as to be able to compose 5 different pitches, in order to admit articles of more or less large horizontal dimensions. One advantageous embodiment (FIG. 11) consists in disposing an assembly 2500 A and a group of 3 assemblies 2500 B, C, D, alternately.

Figure 11:
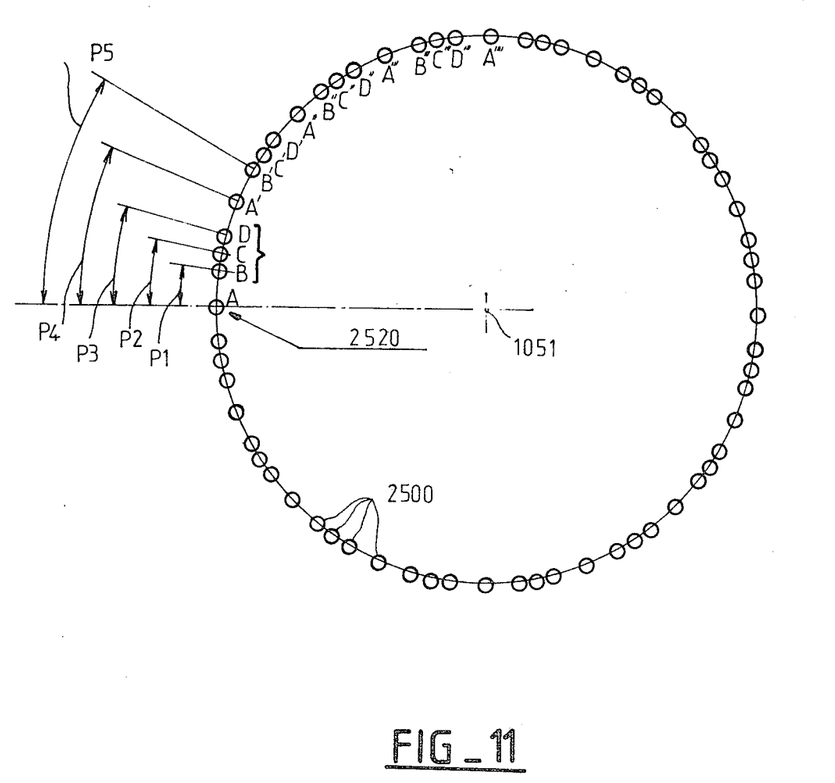
FIG. 11 shows, in schematic horizontal section, the preferred circumferential distribution of the cups on the fire-finishing machine.

By using, for fire-finishing, cups A B D A' B' D' A" . . . , a pitch P1 is obtained; by using A C A' C' A" . . . a pitch P2 is obtained; by using cups A D B' A" D" . . . , a pitch P3 is obtained; by using cups A A' A" . . . , a pitch P4 is obtained and by using cups A B' D" A"", a pitch P5 is obtained.

More precisely, with P1=104 mm, P2=156 mm, P3=208 mm, P4=312 mm and P5=416 mm, articles may be respectively fire-finished without difficulty, of which the horizontal dimensions are equal to about 95 mm, 145 mm, 195 mm, 300 mm and 400 mm.

It appears that the embodiment described with reference to FIGS. 4 to 11 shows an improved fire-finishing machine making it possible to modulate the relative speed of rotation of the cups from the pulleys 1010 and 1012, to maintain these cups fixed by the ring 2108, to adjust the body burners in height and radially by a handle 2004 or by a handle 2029, and the lip burners 1902 radially by a handle 1904. Finally, according to the position of the fingers 1606 and 1608, the path of fire-finishing may be modified as desired and, in particular, modulated by using either the lip burners or the body burners or both at the same time, whilst the fluid flows are optimalised by a prior adjustment of the valves 1802. On the other hand, the possibility of making different pitches allows this fire-finishing machine to be used for a very wide range of articles.

Of course, the present invention described with regard to different embodiments extends to all variants thereof in accordance with its spirit.

What is claimed is:
1. In a fire-finishing machine of the type comprising:

a frame, a central vertical shaft mounted on the frame, a central column mounted to rotate on the shaft, a vertical rotary assembly fast with the column, said assembly comprising article supporting cups and burners disposed in the vicinity of said cups, separate support means being provided for the cups and for the burners, and drive means for ensuring the rotation of the vertical assembly so that the cups describe a circular path, valves are additionally provided to supply said burners, said valves being fast with the rotary assembly and supplied by a rotary distributor mounted on the shaft, and fixed opening and closure control means, fast with the frame, and actuatable separately, are provided to allow selective control of the valves when they cooperate with said control means upon rotation of the assembly.

2. The fire-finishing machine of claim 1, wherein each article supporting cup is associated with at least one overhanding or ring burner and at least one lateral burner which are supplied with fuel in adjustable manner and separately, in order to fire-finish the lip and/or body of the articles, respectively.

3. The fire-finishing machine of claim 1, wherein the cups, which are mounted to rotate on their support means, are subjected to adjustable and disconnectable drive means allowing a rotary or non-rotary fire-finishing depending on the shape of the article.

4. The fire-finishing machine of claim 1, wherein the support means for the cups are distributed circumferentially around the vertical rotary assembly as alternate groups, providing different pitches for fire-finishing.

5. The fire-finishing machine of claim 1, wherein at least one burner per cup is mounted to be radially adjustable with respect to the vertical assembly by a manual adjusting device of the endless screw type, in order to allow a simultaneous adjustment of all the burners and a precise fire-finishing of a zone of the article to be fire-finished.

6. The fire-finishing machine of claim 1, wherein said support means for supporting the article supporting cups are fast with the column and constituted by a horizontal plate on the lower surface of which are fixed roller bearing cases in which pass vertical shafts of the support cups, and on the upper surface of which are located protecting covers which protect the shafts of the support cups and the rollers from the calorific effects of fire-finishing and from the abrasion of crushed glass.

7. The fire-finishing machine of claim 6, wherein drive means are provided for ensuring the rotation of the support cups on themselves and comprise at least one pinion sliding vertically on the shafts of the support cups between a position where said pinion meshes on a toothed ring fixed with respect to the central column, this position having for its effect to prevent the rotation of the support cups on themselves, and at least one other position where said pinion meshes on a ring which is either fixed with respect to the frame of the machine, or driven at variable speed, and in this position the support cups rotate on themselves, the selection between these two positions of the sliding pinion being made by means of a cam path system in abutment on a roller fast with the shaft of the cups and whose height is adjustable.

8. The fire-finishing machine of claim 2, wherein the central column comprises a drive sleeve on which are movably mounted a first bearing sleeve and a second bearing sleeve of which the peripheries are threaded in order to act, by endless screw effect, respectively on a lateral burner holder plate and a ring burner holder plate guided by a cross piece fixed with respect to the drive sleeve so that said holder plates may be adjusted in height.

9. The fire-finishing machine of claim 2, wherein said opening and closing control means for opening and closing the flows of fuel supplying the ring burners and the lateral burners comprise two rows of fingers attached to a plate fixed to the central shaft and located above the burners, said fingers alternately opening and closing the valves on passage of said valves vertically plumb with said fingers.

10. The fire-finishing machine of claim 1, wherein means for supplying and evacuating articles are provided in the form of turntables, of which the respective position on the periphery of the machine may be adjusted.

11. The fire-finishing machine of claim 1, wherein flow regulating valves are provided downstream of the valves, for optimizing the yield of the burners.

12. The fire-finishing machine of claim 2, wherein a device for manually adjusting the inclination of the lateral burner is provided, comprising a threaded helical ring movable in height with respect to the central shaft to incline all the lateral burners simultaneously around a respective horizontal axis.

* * * * *